(12) United States Patent
Hepler

(10) Patent No.: US 10,131,079 B2
(45) Date of Patent: Nov. 20, 2018

(54) SIDE GATE NOZZLE ASSEMBLY WITH A WASHER MADE OF A SHAPE MEMORY ALLOY

(71) Applicant: Douglas Christopher Hepler, Rochester, NY (US)

(72) Inventor: Douglas Christopher Hepler, Rochester, NY (US)

( * ) Notice: Subject to any disclaimer, the term of this patent is extended or adjusted under 35 U.S.C. 154(b) by 350 days.

(21) Appl. No.: 15/220,540

(22) Filed: Jul. 27, 2016

(65) Prior Publication Data

US 2018/0029270 A1 Feb. 1, 2018

(51) Int. Cl.
*B29C 45/27* (2006.01)
(52) U.S. Cl.
CPC ........ *B29C 45/278* (2013.01); *B29C 45/2735* (2013.01); *B29C 2045/2761* (2013.01); *B29C 2045/2783* (2013.01)
(58) Field of Classification Search
CPC .... B29C 2045/2761; B29C 2045/2783; B29C 45/2735; B29C 45/278
See application file for complete search history.

(56) References Cited

U.S. PATENT DOCUMENTS

| 2004/0241277 A1* | 12/2004 | Schmidt | B29C 45/2737 425/549 |
| 2014/0037782 A1* | 2/2014 | Ravagnani | B29C 45/281 425/567 |
| 2014/0363534 A1* | 12/2014 | Overfield | B29C 45/2735 425/568 |

* cited by examiner

*Primary Examiner* — Jill L Heitbrink

(57) ABSTRACT

A side gate nozzle assembly for a hot runner apparatus comprises a disc shaped base body, a probe member, a sealing insulator, and a shape memory alloy washer. The probe member with a probe channel extends from the base body. A molten molding material is received through a melt channel of the nozzle body, and allowed to pass through the probe channel to be transferred to a cavity of a cavity member. The shape memory alloy washer is positioned between the base body and the sealing insulator. The shape memory alloy washer distorts linearly to push the sealing insulator and the probe member according to change in temperature due to transfer of the molten molding material from the melt channel to the cavity member via the probe channel. The distorted shape memory alloy washer prevents leakage of the molten molding material from the melt channel, and the probe channel.

10 Claims, 17 Drawing Sheets

SIDE GATE NOZZLE ASSEMBLY WITH A WASHER MADE OF A SHAPE MEMORY ALLOY

FIELD OF THE INVENTION

The present invention relates to a side gate nozzle device with a washer arrangement in a hot runner apparatus. More specifically the present invention relates to a side gate nozzle assembly with a washer made of a shape memory alloy in a hot runner apparatus.

BACKGROUND

Nozzle assemblies in hot runner systems are generally known in the art. In these existing systems, the gate nozzle assemblies are mostly fixed to the nozzle body of the gate nozzle assemblies. During a drastic change in the temperature of the hot runner system after the introduction of the molten plastic, the nozzle body expands predominantly in a longitudinal direction thereby relocating the gate nozzle assemblies along the longitudinal axis. Therefore, a need exists in the hot runner industry for a better method of assembly and installation of edge gate systems for such molding process, where such methods need to counter relocation of the gate nozzle assemblies, which might cause misalignment of corresponding components during the molding process.

Since, the edge gate systems typically need to be side loaded into the mold cavity, and then slid in to the gate seal where some clearance is required between the gate seal and the manifold to allow the molding procedure to be initiated. Therefore, when the assembled hot runner system is installed into the molding machine and injected with the molten plastic, the clearance between the gate seal and the manifold is a section that can leak plastic, thereby causing failures with the hot runner assembly. It is essential this seal area can withstand the injection pressure of the melt stream passing through it. Prior art devices addresses this potential leaking situation by using Belleville style washers. The gate assembly with this type of washer, when not installed into the mold/hot runner system, is larger than the area in which it will be installed into. When the gate assembly is inserted into the mold cavity and then the hot runner, this Belleville washer acts like a spring, compressing and applying a preload between the face of the gate seal and the hot runner The use of Belleville washer has several technical limitations such as a very low amount of force that is generated and the reduction in spring force that occurs because of heating and cooling cycles of the washer, as the hot runner system is heated and cooled. This results in the spring force of the Belleville washer being reduced over time to the point that it cannot withstand the force generated by the projected surface of the material flow path within the hot runner and gate seal. This results in leaking past the seals and thereby rendering the hot runner system unusable. There is a need for a device that addresses the problems noted above and employs the use of a convenient material for the construction of the sealing members in the overall assembly.

SUMMARY OF THE INVENTION

A side gate nozzle assembly for a hot runner apparatus is disclosed here, where the side gate nozzle assembly is positioned between a cavity member of a mold plate, and a nozzle body of a manifold. The side gate nozzle assembly comprises generally disc shaped base body, a probe member, a sealing insulator, and shape memory alloy washer or washers. The probe member extends forward from the base body, where the probe member comprises a probe channel along the length of the probe to allow passage of a molten molding material. The molten molding material is received through a melt channel of the nozzle body, and allowed to pass through the probe channel to transfer the molten molding material to a cavity of the cavity member.

The sealing insulator is positioned proximal to the distal end of the probe member, and the shape memory alloy washer is inserted along the probe member. The shape memory alloy washer is made of Nitinol, also known as NiTi. This shape memory effect comes from the mixture of nickel and titanium transferring between an martensitic and an austenite phases of crystal structure. This phase change at a programmed temperature, causes the washer to change from a flat state to one predetermined by infusing the NiTi with a pre-programmed shape. The phase change from the martensitic or flat state, to the Austenite state or predefined shape, generates the linear motion to allow sliding engagement between the nozzle body and the cavity member. Further, the shape memory alloy washer changes shape due to the heating up of the hot runner apparatus, past the shape memory alloy's phase change temperature.

The shape memory alloy washer is positioned between the base body and the sealing insulator, where the shape memory alloy washer distorts linearly to push the sealing insulator and the probe member apart, as a response to the rise in temperature due to the transfer of the molten molding material from the melt channel to the cavity of the cavity member via the probe channel. This expansion of the shape memory alloy washer prevents leakage of the molten molding material from the melt channel, and the probe channel. In an embodiment, the shape memory alloy washer further allow sliding engagement between the nozzle body and the cavity member by expanding linearly to generate a linear motion as a response to the rise in temperature due to the transfer of the molten molding material from the melt channel to the cavity of the cavity member via the probe channel. In an embodiment, the shape memory alloy washer is fastened in a gap between a manifold plate and a backing plate of the hot runner apparatus via a fastener, where the shape memory alloy washer changes shape, and expands or distorts due to the heating up of the hot runner apparatus. Therefore, the shape memory alloy washer provides movement and force to seal the manifold against the nozzle body.

In an embodiment, the side gate nozzle assembly is inserted between the cavity member and the nozzle body in one or more configurations, where each configuration comprises the insertion of the side gate nozzle assembly from a single side, opposing sides, or from four sides or more, of the cavity member. In an embodiment, the shape memory alloy washer of the side gate nozzle assembly in each configuration, expand and close the gap between the cavity member and the nozzle body to allow the flow of the molten molding material through the melt channel and the probe channel.

DETAILED DESCRIPTION OF THE INVENTION

Figure 1A:
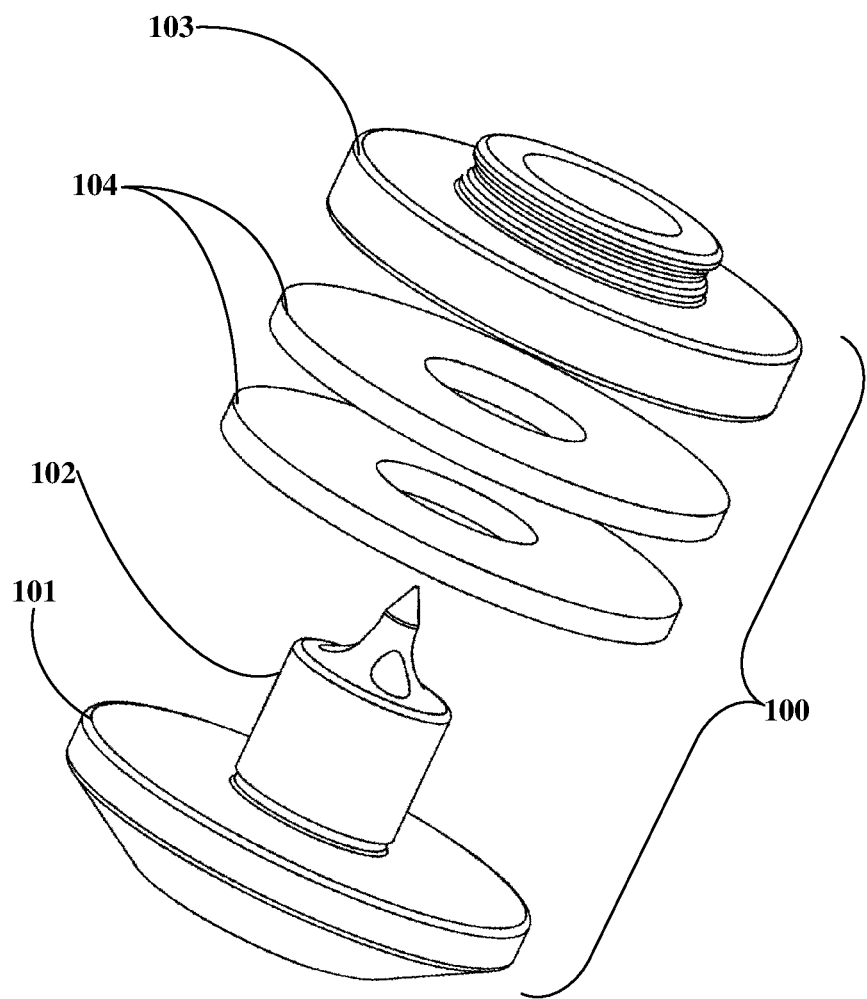
FIG. 1A exemplarily illustrates an exploded view of the side gate nozzle assembly in a cold state.
Figure 1B:
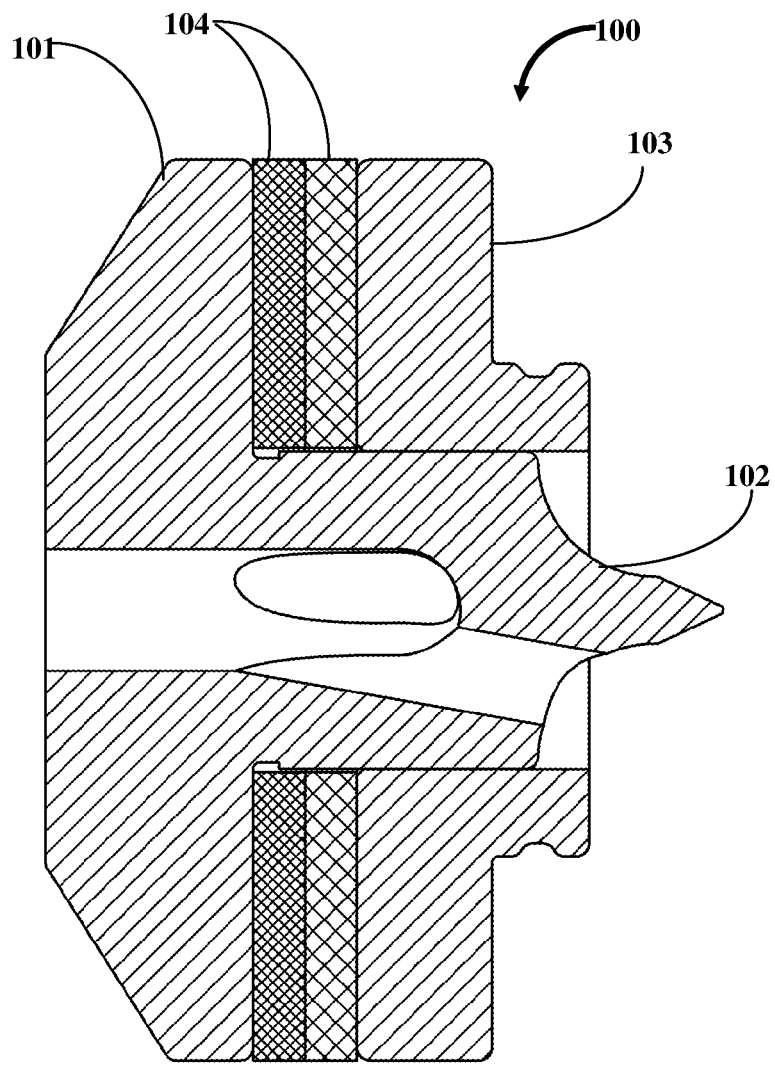
FIG. 1B exemplarily illustrates a sectional view of the assembled side gate nozzle assembly with respect to FIG. 1A, in the cold state.
Figure 4A:
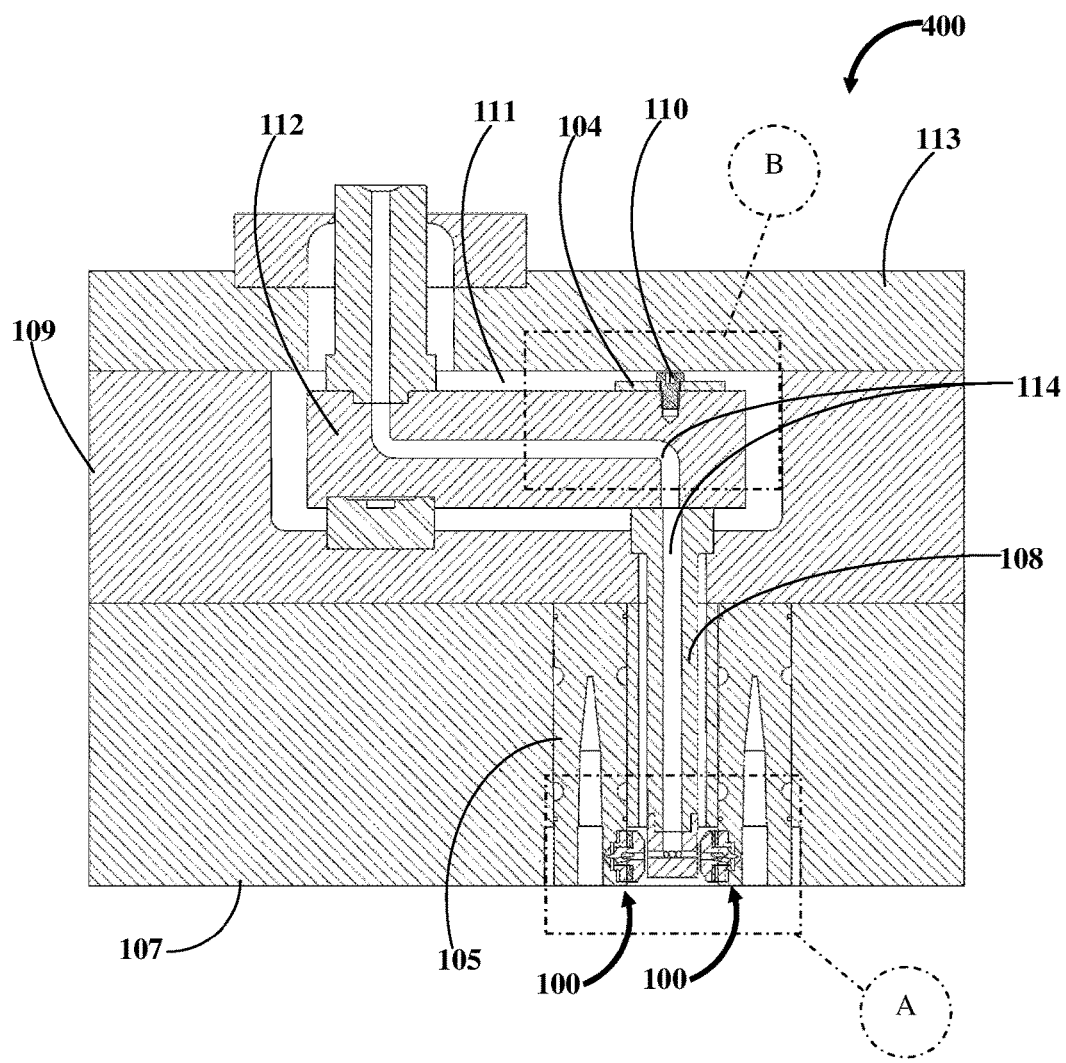
FIG. 4A exemplarily illustrates a sectional view of a hot runner apparatus in the cold state before the introduction of the molten molding material.
Figure 5A:
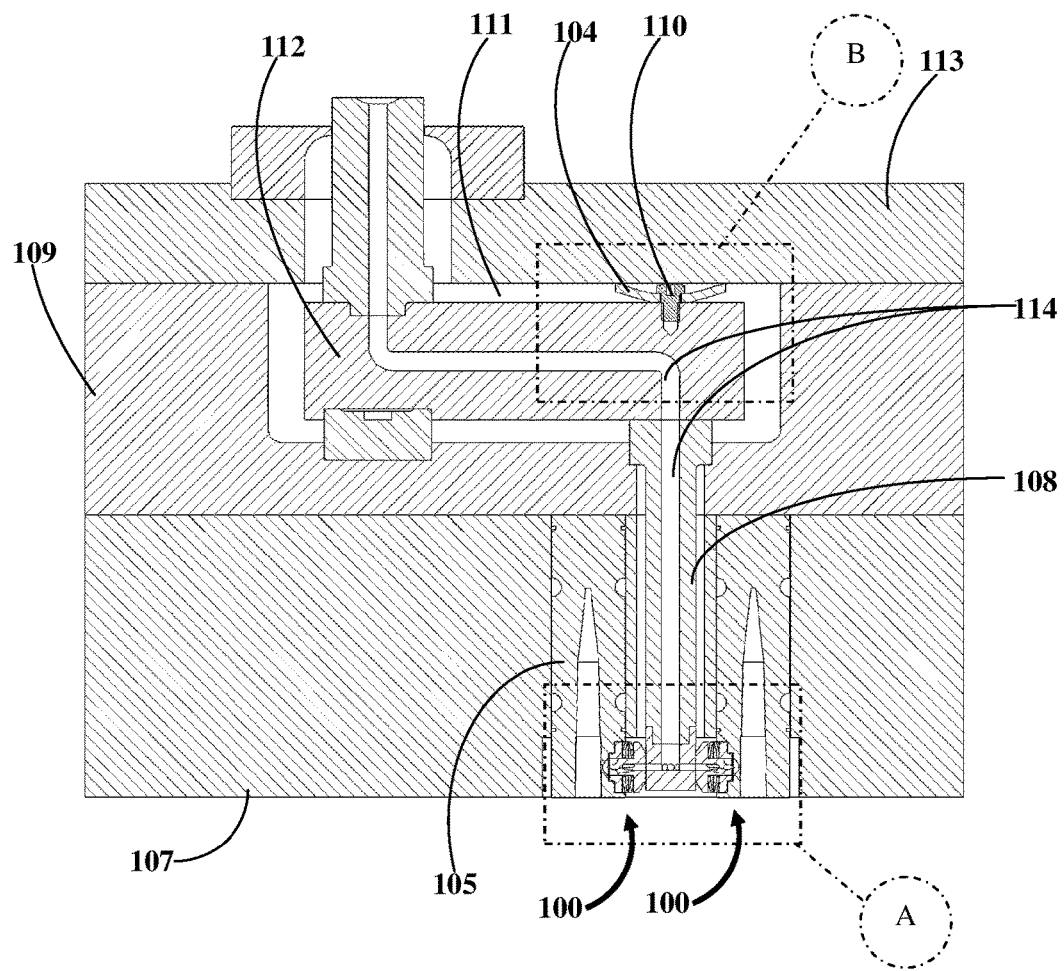
FIG. 5A exemplarily illustrates a sectional view of a hot runner apparatus in the hot state after the introduction of the molten molding material.

Referring to FIGS. 1A-1B, FIG. 1A exemplarily illustrates an exploded view of the side gate nozzle assembly 100 in a cold state, and FIG. 1B exemplarily illustrates a sectional view of the assembled side gate nozzle assembly 100 with respect to FIG. 1A, in the cold state. The side gate nozzle assembly 100 in a hot runner apparatus 400, as shown in FIGS. 4A and 5A, is disclosed herein, where the side gate nozzle assembly 100 is positioned between a cavity member 105 of a mold plate 107, and a nozzle body 108 of a manifold 109. The side gate nozzle assembly 100 comprises a generally disc shaped base body 101, a probe member 102 extending from the base body 101, a sealing insulator 103, and a shape memory alloy washer 104. The shape memory alloy washer 104 are, for example, phase change in nature, where each washer will change shape upon reaching its phase change temperature. This phase change, causes the washer shape change causes 104 to expand when the hot runner apparatus 400 heats up, causing a drastic change in shape in a linear manner with a considerable force. The expansion of the shape memory alloy washer 104 is shown in FIGS. 2A-2B.

Figure 2A:
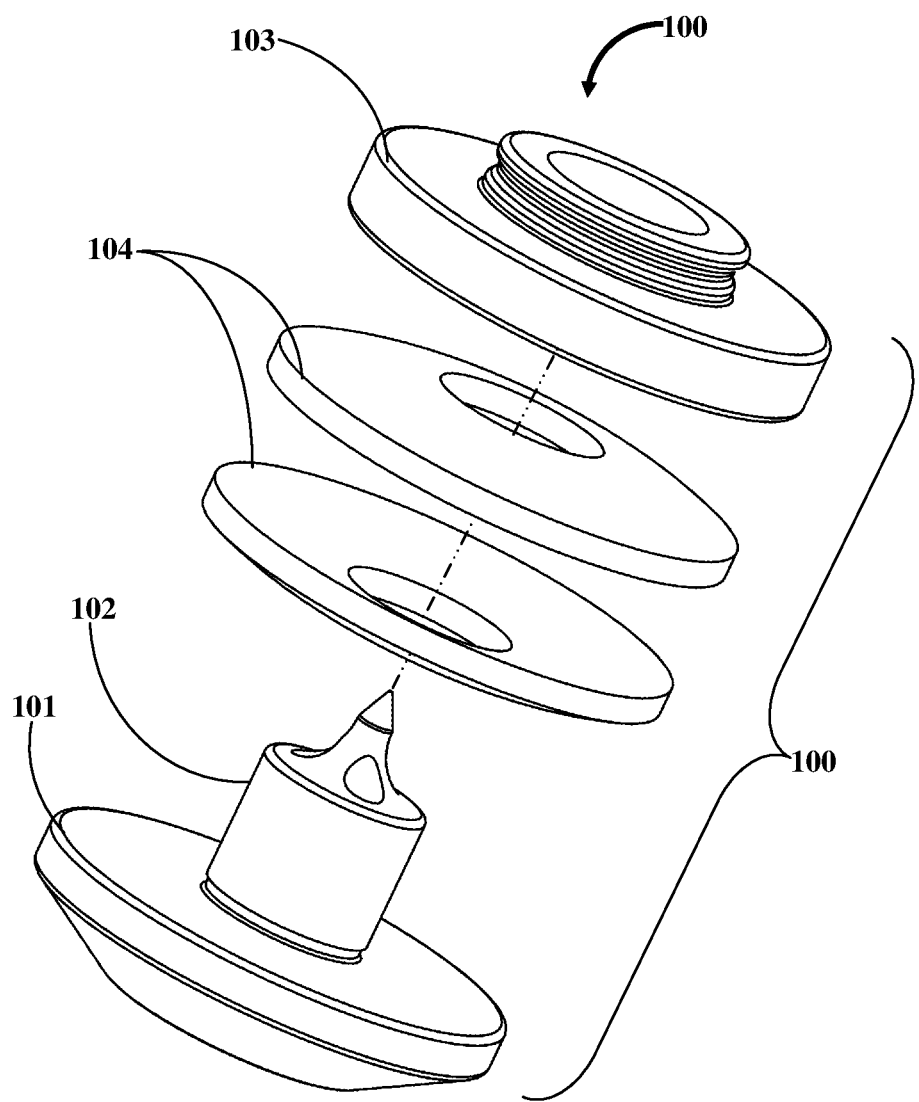
FIG. 2A exemplarily illustrates an exploded view of the side gate nozzle assembly in a hot state.
Figure 2B:
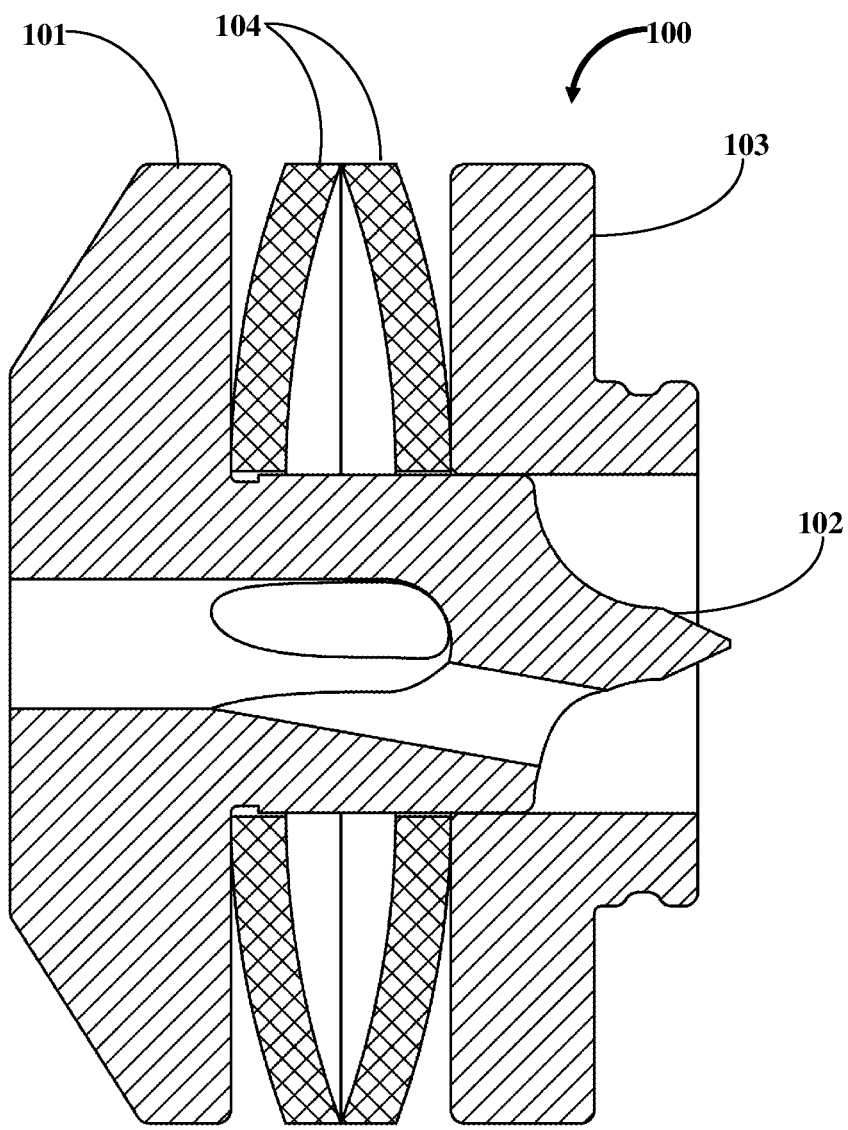
FIG. 2B exemplarily illustrates a sectional view of the assembled side gate nozzle assembly with respect to FIG. 2A, in the hot state.

Referring to FIGS. 2A-2B, FIG. 2A exemplarily illustrates an exploded view of the side gate nozzle assembly 100 in a hot state, and FIG. 2B exemplarily illustrates a sectional view of the assembled side gate nozzle assembly 100 with respect to FIG. 2A, in the hot state. The hot state of the hot runner apparatus 400 is established with the introduction of the molten mold material into the channels. The molten mold material causes the inner surfaces of the hot runner apparatus 400 to expand causing minor dislocation between corresponding molds, and this dislocation can cause leakage of the molten mold material through the channels. In order to prevent this leakage of the molten mold material, the injection nozzle 100 is sandwiched between the cavity member 105 of a mold plate 107, and a nozzle body 108 of a manifold 109 of the hot runner apparatus 400. As shown in FIGS. 2A-2B, the shape memory alloy washer 104 distorts in a generally concave manner, in this embodiment, whereas a plurality of other washer shapes can also be used, for example, wave type, convex type, etc. Further, the shape memory alloy washer 104 fills the gap between the sealing insulator 103 and the base body 101 of the side gate nozzle assembly 100.

The construction of the shape memory alloy washer 104 enables it to change from a relaxed, flat shape when in the cold state, and deform to expand when in the heated state. This deformation when heated translates into a mechanical motion, which can produce a relatively considerable force, which is advantageous for use in conventional hot runner systems. This side gate nozzle assembly 100 uses this relaxed condition in the cold state, to allow ease of assembly of hot runner components. When the components of the hot runner apparatus 400, as shown in FIGS. 4A-4C, are heated, the use and placement of these shape memory alloy components cause deformation and thus mechanical motion.

Figure 3:
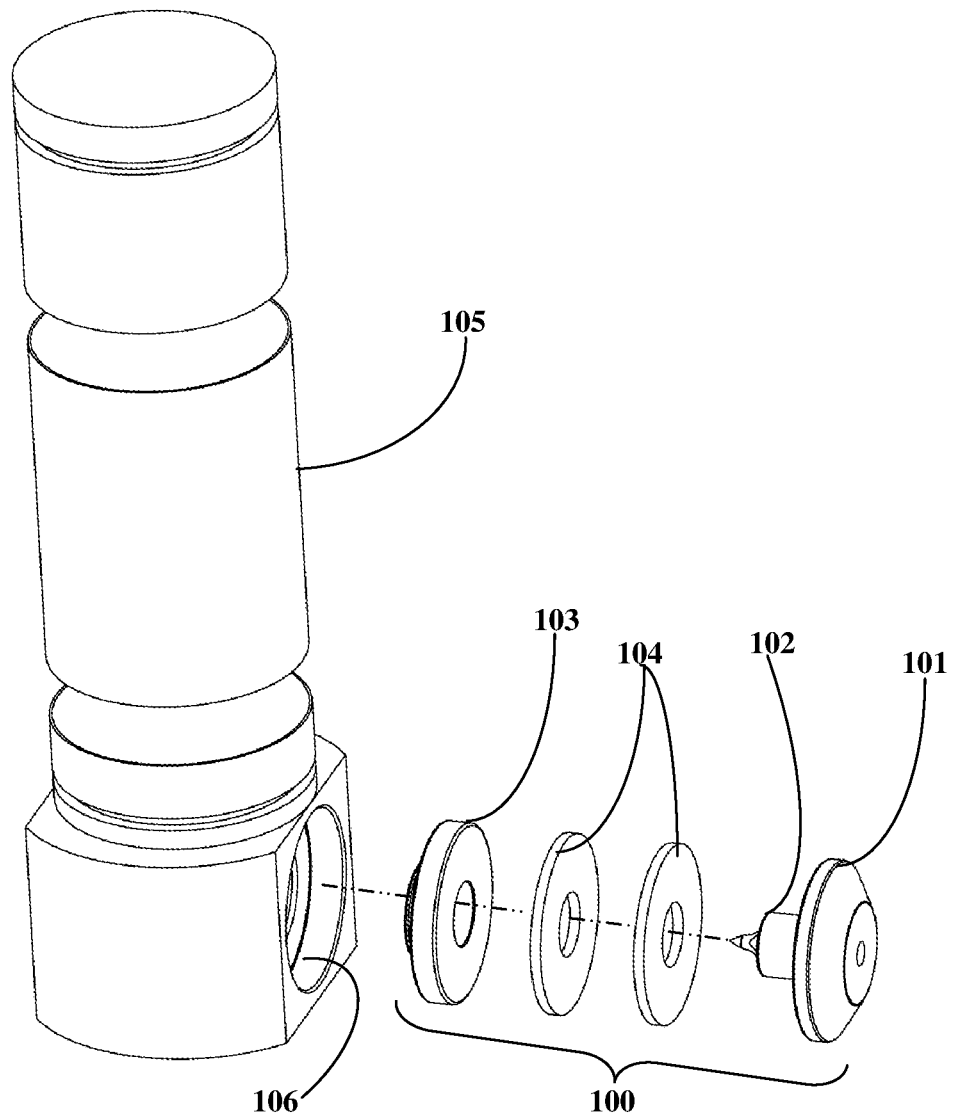
FIG. 3 exemplarily illustrates an exploded view of the side gate nozzle assembly being inserted into a cavity member.

Referring to FIG. 3, which exemplarily illustrates an exploded view of the side gate nozzle assembly 100 being inserted into a cavity member 105. The cavity member 105 is an elongate hollow structure in fluid communication with the nozzle body 108 and the side gate nozzle assembly 100 to receive the molten mold material. The molten mold material is received through a melt channel 114 of the nozzle body 108 and a probe channel 115 of the probe member 102. The cavity member 105 is configured to receive the side gate nozzle assembly 100 at a nozzle receiver opening 106. The side gate nozzle assembly 100 is operably attached to the nozzle receiver opening 106 via a snap-fit configuration or by manual fastening thereof.

Figure 4B:
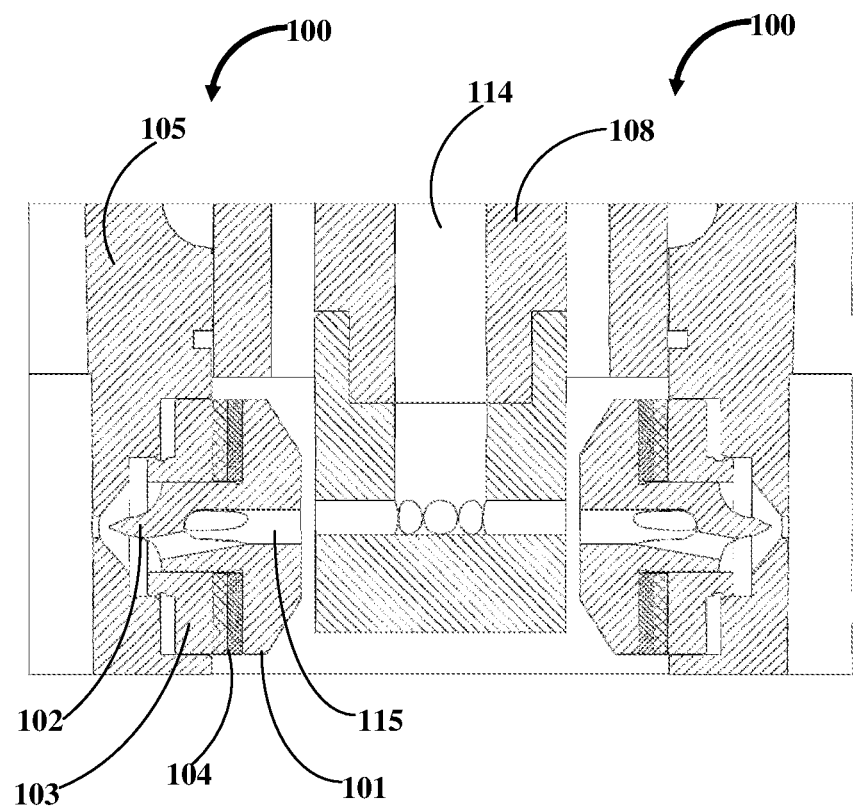
FIG. 4B exemplarily illustrates an enlarged view of the portion marked A in FIG. 4A, showing the side gate nozzle assemblies in non-expanded condition.
Figure 4C:
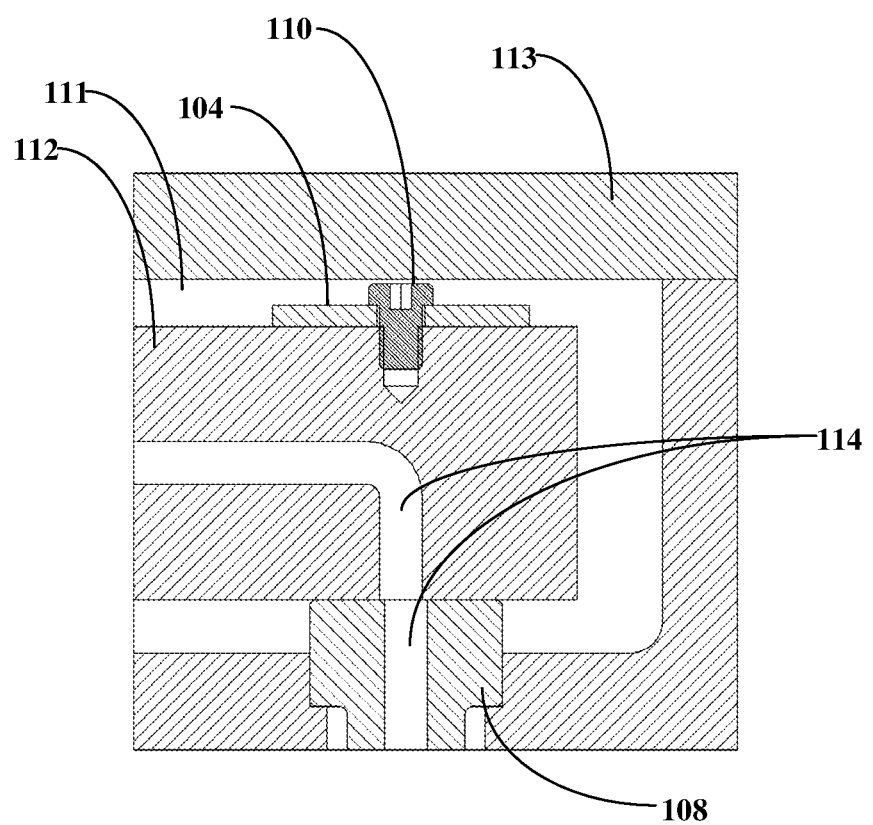
FIG. 4C exemplarily illustrates an enlarged view of the portion marked B in FIG. 4A, showing a shape memory alloy washer fastened via a fastener in a gap between the manifold and a backing plate, in non-expanded condition.

Referring to FIGS. 4A-4C, FIG. 4A exemplarily illustrates a sectional view of a hot runner apparatus 400 in the cold state before the introduction of the molten molding material. As shown in FIG. 4A, the side gate nozzle assembly 100 in a hot runner apparatus 400 is disclosed here, where the side gate nozzle assembly 100 positioned between a cavity member 105 of a mold plate 107, and a nozzle body 108 of a manifold 109. The side gate nozzle assembly 100 comprises a generally disc shaped base body 101, a probe member 102, a sealing insulator 103, and a shape memory alloy washer 104. FIG. 4B exemplarily illustrates an enlarged view of the portion marked A in FIG. 4A, showing the shape memory alloy washer 104 in the side gate nozzle assemblies 100 in non-expanded condition. Before the introduction of the molten molding material into the hot runner apparatus 400, the shape memory alloy washer 104 is configured to be in a stable relaxed condition.

FIG. 4C exemplarily illustrates an enlarged view of the portion marked B in FIG. 4A, showing a shape memory alloy washer 104 fastened via a fastener 110 in a gap 111 between a manifold plate 112 and a backing plate 113, in non-expanded condition. In an embodiment, one shape memory alloy washer 104 is fastened in a gap 111 between the manifold plate 112 and a backing plate 113 of the hot runner apparatus 400 via a fastener 110, where the shape memory alloy washer 104 deforms due to the heating up of the hot runner apparatus 400 past the shape memory alloy's phase change temperature 400. Therefore, the shape memory alloy washer 104 provides movement and force to seal the manifold 109 against the nozzle body 108. The probe member 102 extends forward from the base body 101, where the probe member 102 comprises a probe channel 115 as disclosed in FIG. 5A-5C.

Figure 5B:
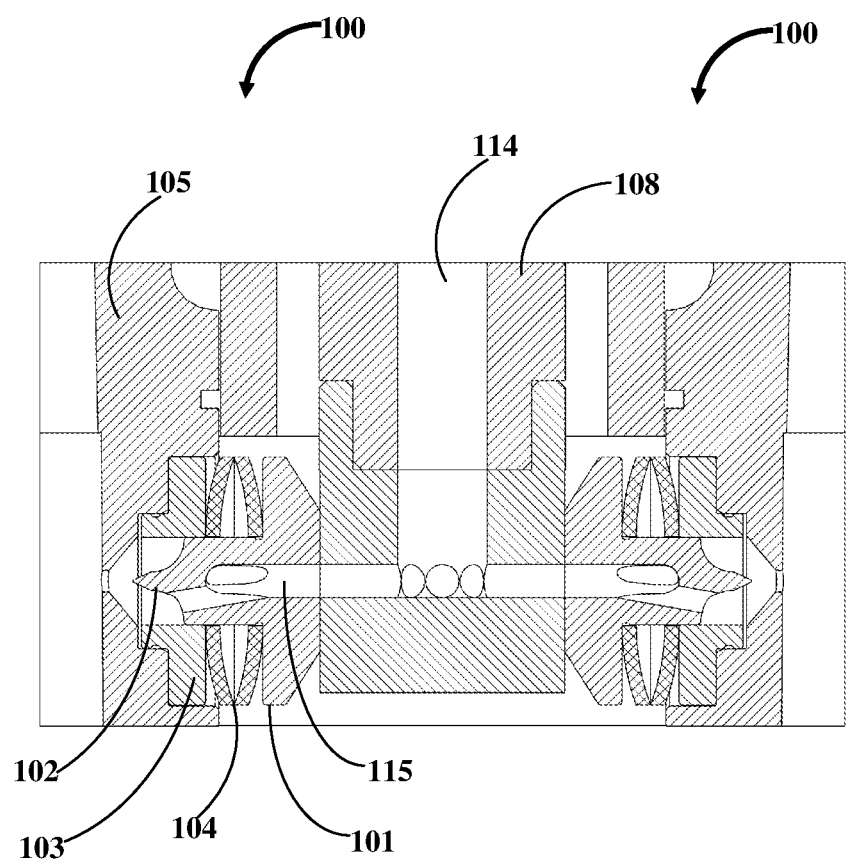
FIG. 5B exemplarily illustrates an enlarged view of the portion marked A in FIG. 5A, showing the side gate nozzle assemblies in an expanded condition.
Figure 5C:
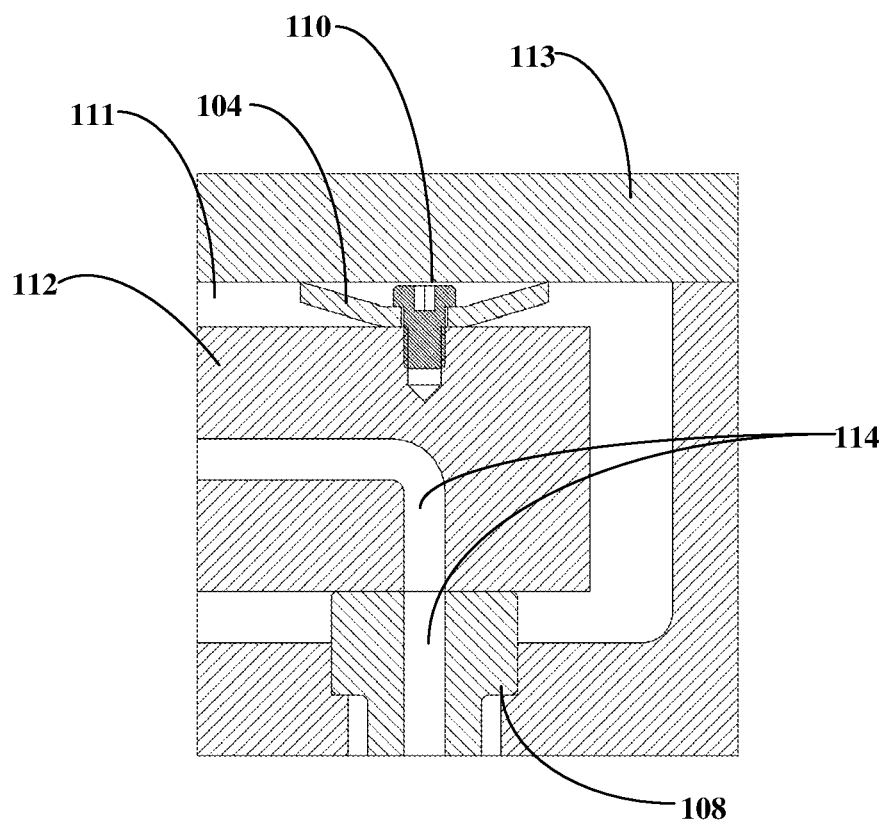
FIG. 5C exemplarily illustrates an enlarged view of the portion marked B in FIG. 5A, showing the shape memory alloy washer fastened via a fastener in a gap between the manifold and a backing plate, in an expanded condition.

Referring to FIG. 5A-5C, FIG. 5A exemplarily illustrates a sectional view of a hot runner apparatus 400 in the hot state after the introduction of the molten molding material. The probe member 102 extends forward from the base body 101, where the probe member 102 comprises a probe channel 115 along the length of the probe member 102 to allow passage of a molten molding material. The molten molding material is received through a melt channel 114 of the nozzle body 108, and allowed to pass through the probe channel 115 to transfer the molten molding material to a cavity of the cavity member 105. The sealing insulator 103 is positioned proximal to the distal end of the probe member 102, and the shape memory alloy washer 104 is inserted along the probe member 102. The shape memory alloy washer 104 is positioned between the base body 101 and the sealing insulator 103, where the bi-metallic thermal washer 104 distorts or expands linearly to push the sealing insulator 103 and the probe member 102 apart as a response to the rise in temperature due to the transfer of the molten molding material from the melt channel 114 to the cavity of the cavity member 105 via the probe channel 115, as well as general heating up of the hot runner apparatus 400.

FIG. 5B exemplarily illustrates an enlarged view of the portion marked A in FIG. 5A, showing the shape memory alloy washer 104 in the side gate nozzle assemblies 100 in an expanded condition. This expansion of the shape memory alloy washer 104 prevents leakage of the molten molding material from the melt channel 114, and the probe channel 115. In an embodiment, the shape memory alloy washer 104 further allows sliding engagement between the nozzle body 108 and the cavity member 105 by expanding linearly to generate a linear motion as response to the rise in temperature due to the transfer of the molten molding material from the melt channel 114 to the cavity of the cavity member 105 via the probe channel 115. In an embodiment, the material of the shape memory alloy washer 104 is made of a mixture of nickel and titanium transferring between the martensite and austenite phases of crystal structure washer 104 to expand or deform when heated past its phase change temperature, which generates the linear motion to allow sliding engagement between the nozzle body 108 and the cavity member 105. The mixture of nickel and titanium which forms the shape memory alloy washer 104 is referred to as Nitinol, which is also known as NiTi.

FIG. 5C exemplarily illustrates an enlarged view of the portion marked B in FIG. 5A, showing the shape memory alloy washer 104 fastened via a fastener 110 in a gap 111 between the manifold 109 and a backing plate 113, in an expanded condition. As the molten mold material passes through the melt channel 114 of the manifold plate 112 and the nozzle body 108, the excessive heat generation causes a sudden variation in the gap 111 between the backing plate 113 and the manifold plate 112. In order to counter this sudden variation in the gap 111 between the manifold plate 112 and the backing plate 113, the shape memory alloy washer 104 fastened between the backing plate 113 and the manifold plate 112 expands to fill the gap 111 and keep the manifold plate 112, and the nozzle body 108 in perfect alignment for the molten mold material to be transferred from the nozzle body 108 to the cavity member 105 without any leakage.

Referring further to FIG. 5C, in this configuration of the shape memory alloy washer 104, it can be shaped into a form that is used to absorb thermal expansion of components of the hot runner apparatus 400. An example of this is the shape memory alloy washer 104, which is positioned between a hot runner manifold 109 and a backing plate 113. As the hot runner manifold 109 heats up, because of thermal expansion it gets thicker. As the hot runner manifold 109 gets hotter and thicker, the gap 111 between the hot runner manifold 109 and the mold top clamp plate, or the backing plate 113, is reduced. Due to the high pressure and force generation, it is necessary to fill this gap 111 with some type of support pillar, which is normally a solid disc with the thermal expansion taken into consideration, so that it can seal, but is not too thick that it may cause damage when the mold is clamped shut. This embodiment of the bi-metallic thermal washer 104 provides a solid disc support pillar that automatically adjusts to fill this gap 111 regardless of the operating temperature of the hot runner manifold 109. By selection of variable thickness of this shape memory alloy washer 104, different pressure requirements and dimensions of the hot runner apparatus 400 can be compensated according to the different applications of the hot runner apparatus 400.

Figure 6A:
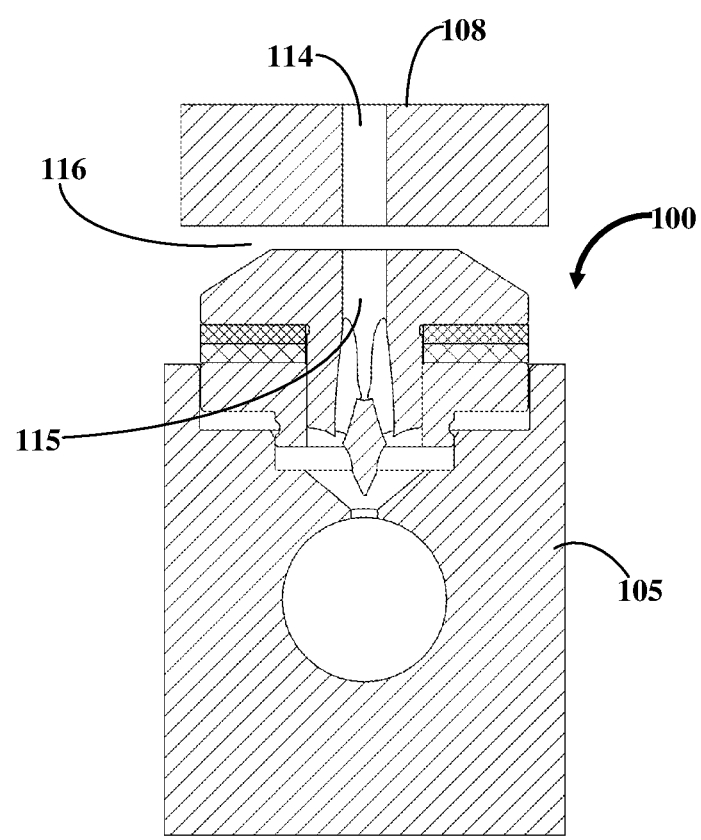
FIG. 6A-6B exemplarily illustrates an embodiment of the arrangement of the injection nozzle inserted from a single side of the cavity member.
Figure 6B:
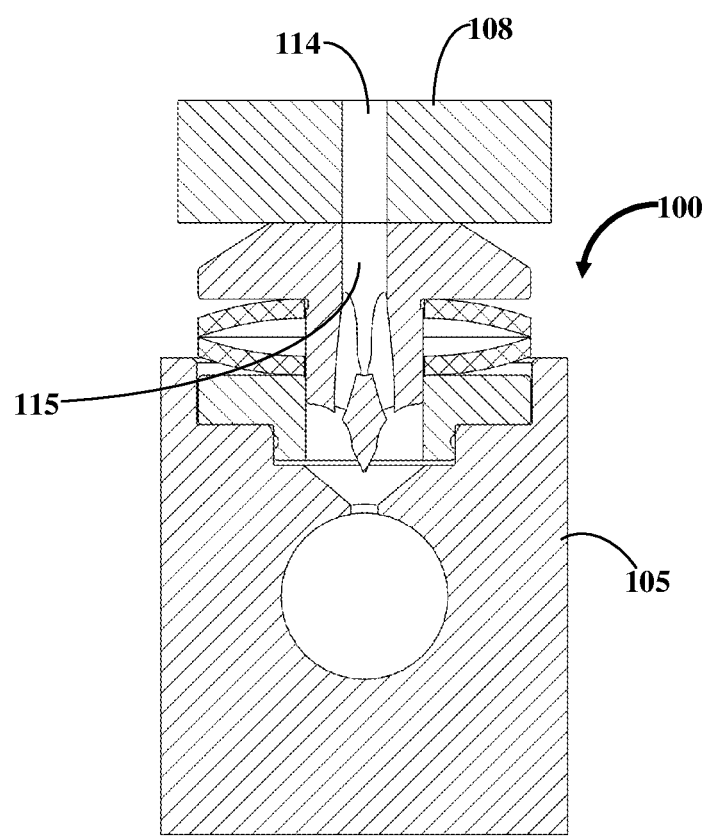
Figure 7A:
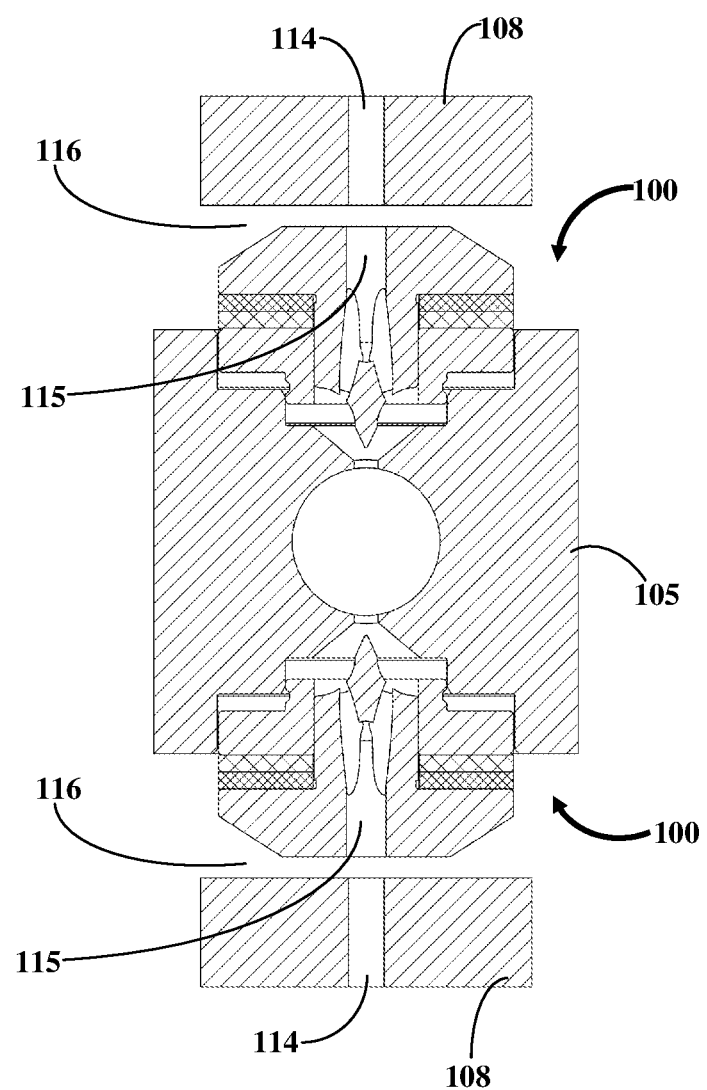
FIG. 7A-7B exemplarily illustrates an embodiment of the arrangement of the injection nozzle inserted from opposing sides of the cavity member.
Figure 7B:
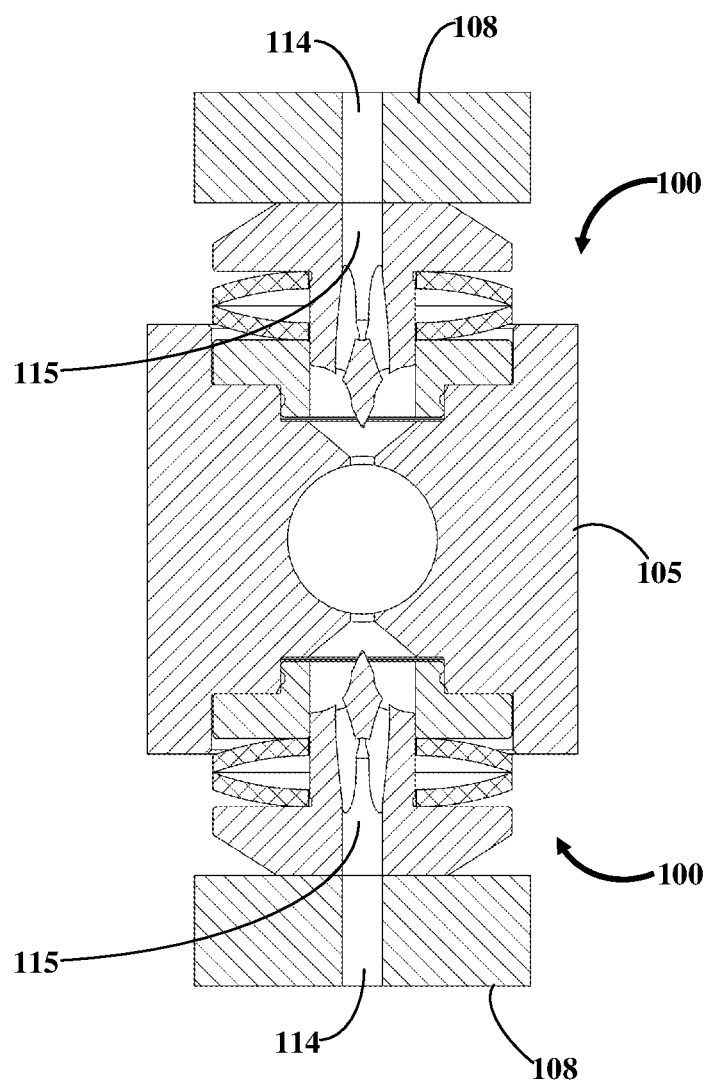
Figure 8A:
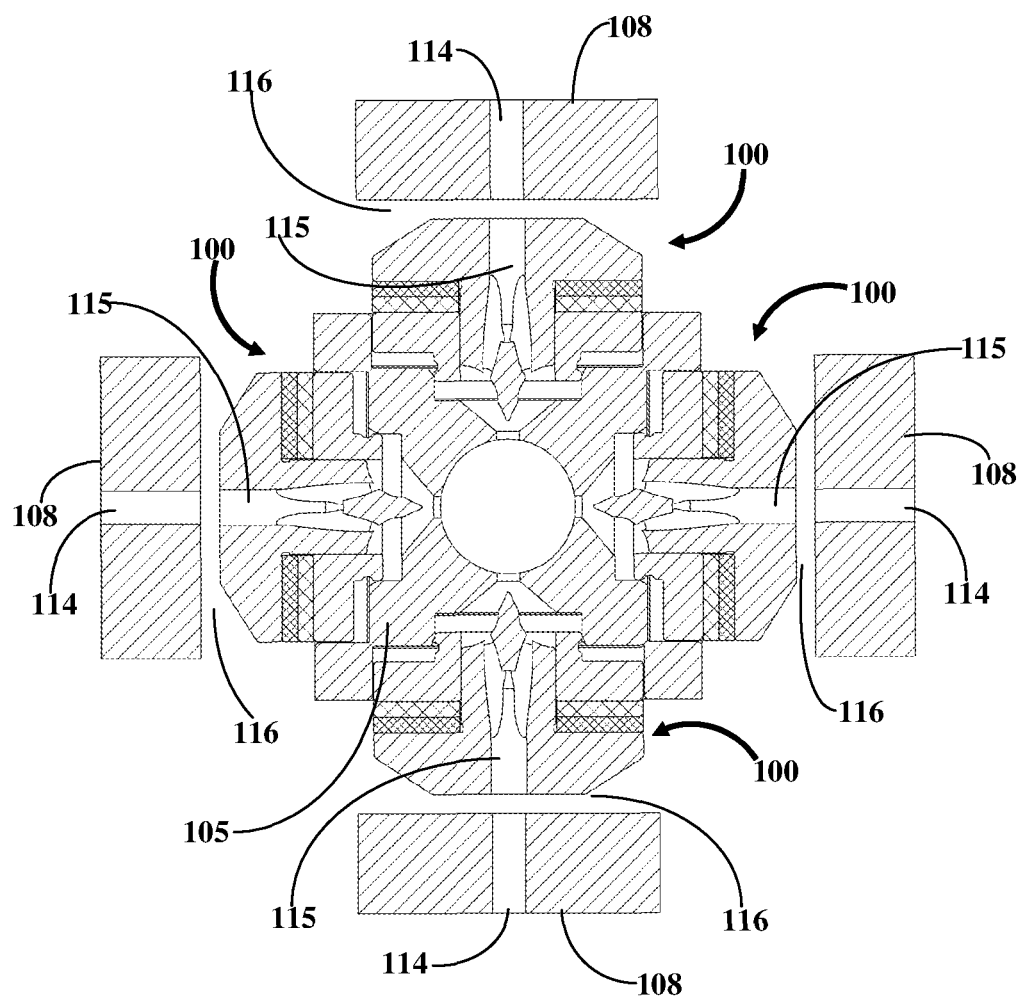
FIG. 8A-8B exemplarily illustrates an embodiment of the arrangement of the injection nozzle inserted from four sides of the cavity member.
Figure 8B:
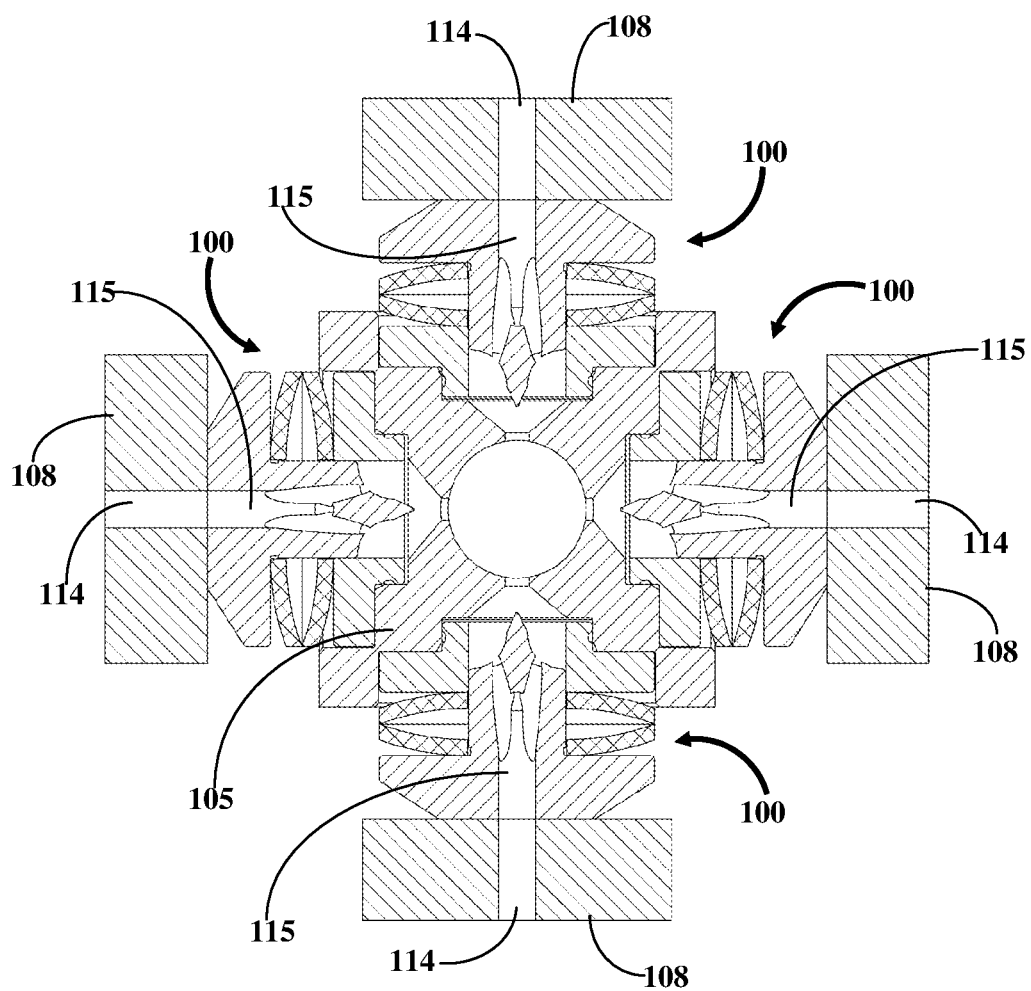

FIG. 6A-6B exemplarily illustrates an embodiment of the arrangement of the injection nozzle 100 inserted from a single side of the cavity member 105. FIG. 7A-7B exemplarily illustrates an embodiment of the arrangement of the injection nozzle 100 inserted from opposing sides of the cavity member 105. FIG. 8A-8B exemplarily illustrates an embodiment of the arrangement of the injection nozzle 100 inserted from four sides or more, of the cavity member 105. In all the embodiments from FIGS. 6A-8B, the shape memory alloy washers 104 of the side gate nozzle assembly 100 in each configuration, expands and closes a gap 116 between the cavity member 105 and the nozzle body 108 to allow the flow of the molten molding material through the melt channel 114 and the probe channel 115.

In another embodiment, one or more shape memory alloy washers 104 are positioned and stacked together in between a probe member 102 and seal ring of the cavity member 105. When cold, or at room temperature, this assembly is in the "install" or non-expanded state. This allows easy installation into the side of a mold cavity, which then together, can be inserted into a position that aligns with a flow path in a nozzle body 108 or manifold 109. When the side gate nozzle assembly 100 is heated, or when the molten molding material is allowed to flow into the cavity of the cavity member 105, the side gate nozzle assembly 100 expands creating a preloaded seal between the cavity and the nozzle body 108 or manifold 109.

Further as shown in the different configurations of FIGS. 6A-6B, this amount of this force can be increased by stacking one or more shape memory alloy washers 104, with them all facing the same direction. For example, if one washer generates 20 pounds (lbs) of force at a predetermined temperature, 2 shape memory alloy washers 104 are stacked the same way so they deflect in the same direction would generate 40 lbs of force. In this configuration, the amount thermal deflection is unchanged regardless of the amount of shape memory alloy washers 104 stacked together at the same temperature.

In some cases in the hot runner apparatus 400, it is desired to increase the amount of thermal displacement, or movement, at the predefined temperature than one shape memory alloy washer 104 can provide. In this case, more than one shape memory alloy washers 104 can be stacked whereas the amount of warping of each shape memory alloy washer 104 is multiplied by the amount of total number of shape memory alloy washers 104. In an embodiment, the shape memory alloy washers 104 are configured to deflect or expand within a predefined distance at a predefined phase change temperature. For example at a predefined phase change temperature, one washer deflects 0.005 inch. Two shape memory alloy washers 104 at the same predefined temperature would deflect 0.010 inches. In this arrangement of the shape memory alloy washers 104, the increased number of shape memory alloy washers 104 does not affect the overall force of the assembly.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

The invention claimed is:

1. A side gate nozzle assembly for a hot runner apparatus, the side gate nozzle assembly positioned between a cavity member of a mold plate, and a nozzle body of a manifold, the side gate nozzle assembly comprising:
 a generally disc shaped base body;
 a probe member extending forward from the base body, wherein the probe comprises a probe channel along the length of the probe to allow passage of a molten molding material, wherein the molten molding material is received through a melt channel of the nozzle body, and allowed to pass through the probe channel to transfer the molten molding material to a cavity of the cavity member;
 a sealing insulator positioned proximal to the distal end of the probe member; and
 a shape memory alloy washer inserted along the probe member, and positioned between the base body and the sealing insulator, wherein the shape memory alloy washer distorts linearly to push the sealing insulator and the probe member apart as a response to the rise in temperature due to the transfer of the molten molding material from the melt channel to the cavity of the cavity member via the probe channel, thereby preventing leakage of the molten molding material from the melt channel, and the probe channel.

2. The side gate nozzle assembly of claim 1, wherein the shape memory alloy washer further allows sliding engagement between the nozzle body and the cavity member by expanding linearly to generate a linear motion as response to the rise in temperature due to the transfer of the molten molding material from the melt channel to the cavity of the cavity member via the probe channel.

3. The side gate nozzle assembly of claim 2, wherein the shape memory alloy washer is made from a mixture of nickel and titanium, thereby causing a phase change between an martensite phase and an austenite phase of crystal structure causing a deformation of the shape memory alloy washer, which generates the linear motion to allow sliding engagement between the nozzle body and the cavity member.

4. The side gate nozzle assembly of claim 1, wherein the shape memory alloy washer is fastened in a gap between a manifold plate and a backing plate of the hot runner apparatus via a fastener, wherein the shape memory alloy washer deforms due to the heating up of the hot runner apparatus, thereby providing movement and force to seal the manifold against the nozzle body.

5. The side gate nozzle assembly of claim 1, wherein the side gate nozzle assembly is inserted between the cavity member and the nozzle body in one or more configurations, wherein each configuration comprises the insertion of the side gate nozzle assembly from one of a single side, opposing sides, and from four sides of the cavity member.

6. The side gate nozzle assembly of claim 5, wherein the shape memory alloy washer of the side gate nozzle assembly in each configuration, expand and close the gap between the cavity member and the nozzle body to allow the flow of the molten molding material through the melt channel and the probe channel.

7. The side gate nozzle assembly of claim 5, wherein the shape memory alloy washer of variable thickness is selected for different pressure requirements and pressure differences across different applications of the hot runner apparatus.

8. The side gate nozzle assembly of claim 1, wherein when the molten molding material is allowed to flow into the cavity of the cavity member, the side gate nozzle assembly expands to create a preloaded seal between the cavity member and the nozzle body.

9. The side gate nozzle assembly of claim 1, wherein more than one shape memory alloy washer is stacked over each other, wherein an amount of warping of each shape memory alloy washer is multiplied by the total number of shape memory alloy washers.

10. The side gate nozzle assembly of claim 1, wherein the shape memory alloy washer is configured to deflect within a predefined distance at a predefined phase change temperature.

\* \* \* \* \*